United States Patent [19]

Brunsgard

[11] Patent Number: 5,210,794
[45] Date of Patent: May 11, 1993

[54] APPARATUS AND METHOD FOR ESTABLISHING CRYPTO CONFERENCES ON A TELECOMMUNICATIONS NETWORK

[75] Inventor: Bente H. Brunsgard, Oslo, Norway

[73] Assignee: Alcatel, N.V., Amsterdam, Netherlands

[21] Appl. No.: 633,240

[22] Filed: Dec. 21, 1990

[30] Foreign Application Priority Data

Dec. 22, 1989 [NO] Norway .................. 895210

[51] Int. Cl.$^5$ .............. H04K 1/02; H04M 3/42; H04Q 11/04
[52] U.S. Cl. ........................ 380/9; 370/62; 379/204; 379/205; 380/6; 380/33
[58] Field of Search .............. 379/204, 205; 370/62; 380/6, 9, 33

[56] References Cited

U.S. PATENT DOCUMENTS

| | | | |
|---|---|---|---|
| 3,441,678 | 4/1969 | Budlong et al. | 379/204 |
| 3,674,936 | 7/1972 | Wolfe . | |
| 3,748,394 | 7/1973 | Thomas . | |
| 3,792,202 | 2/1974 | Adams et al. | 379/205 |
| 4,232,198 | 11/1980 | Warman | 379/205 |
| 4,289,932 | 9/1981 | Reed . | |
| 4,635,251 | 1/1987 | Stanley et al. | 379/204 |
| 4,797,877 | 1/1989 | Pope et al. | 379/204 |
| 4,920,565 | 4/1990 | Strawczynski et al. | 380/6 |
| 4,939,773 | 7/1990 | Katz | 379/204 |
| 4,945,534 | 7/1990 | Driscoll et al. | 370/62 |
| 5,023,868 | 6/1991 | Davidson et al. | 370/62 |

Primary Examiner—Stephen C. Buczinski
Attorney, Agent, or Firm—Ware, Fressola, Van Der Sluys & Adolphson

[57] ABSTRACT

A method to establish a speech conference connection between a group of conference participating nodes (2,4,8) which can freely be selected among a greater plurality of nodes (2–9) having conference facilities, and which can be interconnected by at least one telecommunication network (1) having at least one switching exchange (10) for establishing at least one conference ring. Conference participating nodes are provided with completely identical designs so that each node (2,4,8) can perform all signal processing including amplification and speech-coding/decoding in a decentralized manner, while routing and switching of information takes place in the at least one network exchange (10). All the conference participating nodes (2,4,8) are connected in series in a conference ring, which only includes these conference participating nodes (2,4,8) for each new conference ring to be established. Digitally represented sound information is sent from an active sending node acting as one of the conference participating nodes (2,4,8) to other conference participating nodes. The digitally represented sound information is subjected to no other signal processing than ordinary copying in each node. The digitally represented sound information is circulated in the conference ring before it returns back to the active sending node. The digitally represented sound information is deleted in the active sending node.

19 Claims, 2 Drawing Sheets

APPARATUS AND METHOD FOR ESTABLISHING CRYPTO CONFERENCES ON A TELECOMMUNICATIONS NETWORK

BACKGROUND OF THE INVENTION

1. Field of the Invention

The present invention relates to a method and means to obtain a conference connection in telecommunication network, and in particular it relates to a conference connection well adapted for encryption/decryption facilities.

Still more specifically the invention concerns a method to transmit and receive information via a telecommunication network, between a selected plurality of mutually interconnected nodes in a network built up so that each and every node among a freely selected group of conference participating nodes, may send information to all the remaining participating nodes via an established common connection.

2. Description of the Prior Art

It is earlier well known to use conference connections in telecommunications. It may e.g. be referred to a general article by John Ellis and Bruce Townsend, published in Telesis No. 1 1987, pages 22-31: "State of the art in teleconferencing". Here both the technical solutions most used and the relevant problems are thoroughly described.

In another paper presented by D. G. Steer et al, in the conference CRYPTO88, on Jul. 29, 1988 under the title: "A Secure Audio Teleconference System", a specific solution of an encrypted teleconference is described.

It should also be referred to a commonly assigned copending patent application of K. Presttun, filed on the same day as the present application and entitled, "Apparatus and Method for Establishing Conferences on a Telecommunications Network". From this application it is known to connect all the nodes which are participating in a conference, in a single ring connection.

All the above mentioned solutions comprise specific disadvantages as mentioned below.

In the Ellis/Townsend reference the main problem areas in conventional conference bridges; noise, loss and echo; are pointed out, and are more or less overcome by rather conventional methods. We shall mention that with all the solutions mentioned here we have to use a centrally arranged conference bridge, and all such bridge solutions are not ideal when encrypted speech signals are considered, as the signals exist as clear text between the participant's nodes and the central equipment and thus represent a great risk of unauthorized tapping.

In the CRYPTO88 reference, there is shown a solution where the terminals which take part in the conference, are connected in series; or rather in a chain; and then a more secure crypto point-to-point connection is possible, as the decryption/encryption process may be undertaken in each terminal and not in the exchange itself.

A distributed conference system is also briefly mentioned in this CRYPTO88 reference, but it is not further discussed, as it is deemed to be quite impractical.

In the ring system in the co-pending Presttun application, it is required that all echoes from the own transmitted signal is cancelled (or at least suppressed). If the conference includes a satellite connection, a large delay time is introduced, and this must be handled by a filter which represents a rather expensive solution. As the signal circulates through the ring it has to be coded and decoded many times. Each coding/decoding process introduces noise in the system, and to ensure that the total noise shall not be excessive and lead to "singing", the total ring amplification has to kept below unit.

Because of the continuous circle connection some problems arise. We remember that the signal on the circular connection represents the sum of all information received from all of the nodes. Therefore the sum signal which is received at a node has to be decoded, attenuated (so that added noise shall not accumulate), and then it goes to the receiver whereupon the local generated signal is added to the decoded signal. Then the new sum signal, comprising the local generated signal, has to be coded anew before it is retransmitted to the line.

And to avoid acoustic feed back, the echo of own generated signal has to be depressed when it returns to own terminal.

From the above it may be understood that accumulation of noise from the multiple encoding/decoding processes and cancellation of that part of the sum signal which originates from own node represent problems which must be solved in such a ring conference connection.

SUMMARY OF THE INVENTION

Using a solution according to the present invention, both of these problems are avoided.

The object of the present invention is to avoid all the above mentioned drawbacks in a conference connection. Another object is to obtain a conference connection which is especially adapted to cryptographic processes.

The most general principle of the present invention is that each participating node which are connected in a conference connection can transmit information to an information resource to which all the remaining participating nodes can listen. The information resource has to be specific for each participating, transmitting node, i.e. the number of information resources should not exceed the number of participating nodes. And only one participating node shall transmit information to one specific resource at a time, while all participating nodes are "listening" to all the resources all the time during the conference.

Using such an approach the conference solution is in particular suitable for cryptographic conferences, as the encryption/decryption device then can be moved out to each participating node without representing any conflict with the requirement of linearity to the remaining signal treating procedures as speech coding and switching. With the solutions covered by the present invention, we are free to use any signal treating algorithms in the remaining parts of the equipment.

In one specific ISDN solution the number of information resources are always two one-way rings, while the number of conference participating nodes are limited only by the practical configuration.

The information resource(s) may have a star configuration or a ring configuration or may even comprise a combination of such solutions.

In the following description a ring configuration is described most detailed, but the invention also includes all the above mentioned solutions. However it is believed that the ring configuration is most easily adapted to existing networks. And the invention is in particular advantageous when a ring configuration is used in an Integrated Services Digital Network (ISDN).

We shall therefore concentrate our description to the ring configuration without delimiting the invention to such use.

One preferred principle of the present invention is that all the nodes which are included in a conference connection are connected in a two-way ring connection where the physical connection exists all the time, but where there is a dynamic cut in the ring and where the position of this dynamic or moveable cut in the ring is controlled by the activity in the nodes themselves, as explained in more detail below.

A conference connection according to this invention has the following advantages:

It is not required that the signals are summed.

No accumulation of introduced noise occurs, as the signal only is coded/decoded once.

Any algorithm which gives best signal/speech handling may be chosen.

Echo cancelling is not required.

Symmetrical operation is obtained, regardless of the number of nodes.

No central equipment and no protocols required to handle nor the conference neither the encryption/decryption.

DESCRIPTION OF THE DRAWINGS

To give a better understanding of the present invention, it is referred to the detailed description of an embodiment of the invention given below, and to the accompanying drawings in which.

DETAILED DESCRIPTION OF THE PREFERRED EMBODIMENT

Figure 1:
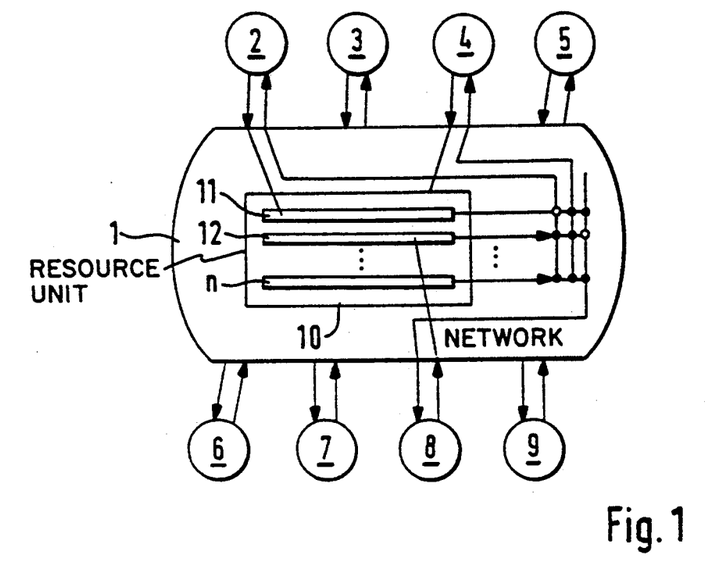
FIG. 1 shows the principles of the invention in a information-bus representation.

First the most general design of our invention shall be explained with reference to FIG. 1.

The nodes 2-9 are all connected to a public telecommunication network 1, and the nodes (2, 4 and 8 in the shown example) which shall be included in this specific conference connection, may be freely selected among all the nodes, and the setting up of the connection between the conference participating nodes, or shorter referred to as the conference nodes, may be organized from any one of the nodes via the network switches (not shown in this Figure). When connected in a conference connection all the conference nodes are also coupled to a information transmission resource unit 10, including at least one resource 11, 12, . . . n. Each of these resources may e.g. be represented by an information bus as shown in the FIG. 1. However a ring configuration could also be used.

The node 2 may transmit information to one bus 11 and all the other nodes participating in the conference may listen to this information. This is suggested by the matrix and related arrows in the right side of FIG. 1.

Now it should be remembered that all the conference nodes are connected in the network in a symmetrical and identical manner, i.e. all the remaining nodes may also transmit information to a specific bus (but only if a free bus is found) and all the participating nodes are listening to this (these) bus(es).

This principle is shown in a simplified manner on the drawing. The node 2 e.g. is transmitting information to the resource or bus 11 and both of the remaining conference nodes 4 and 8, are monitoring or "listening to" this resource. However it is assumed that conference node No. 8, wants to transmit information at the same time as he is listening. Assuming that resource 12 is free, node 8 can access this resource and transmit the desired information to this resource to which all the remaining conference nodes are listening. Thus all nodes "hear" all messages transmitted, and are themselves able to comment the message via another, free resource.

The expression "listening" is used, as the conference usually shall include nothing but spoken information. However additional information, such as e.g. video information, may be included, and still the controlling part of the system shall be the spoken information. If the nodes e.g. include video telephones, it is the speech signals that control the access and switching which has to be included in the system, and the video information simply follows the route decided and set-up by the speech signals.

The system is digital, and all the conference equipment, as speech coding/decoding units and encryption/decryption devises, are arranged within the nodes. Therefore only the nodes which pay for this conference facility may be equipped with conference units. The remaining nodes may have a different and simpler design.

A specific ring embodiment of the present invention shall now be explained with reference to FIG. 2.

Figure 2:
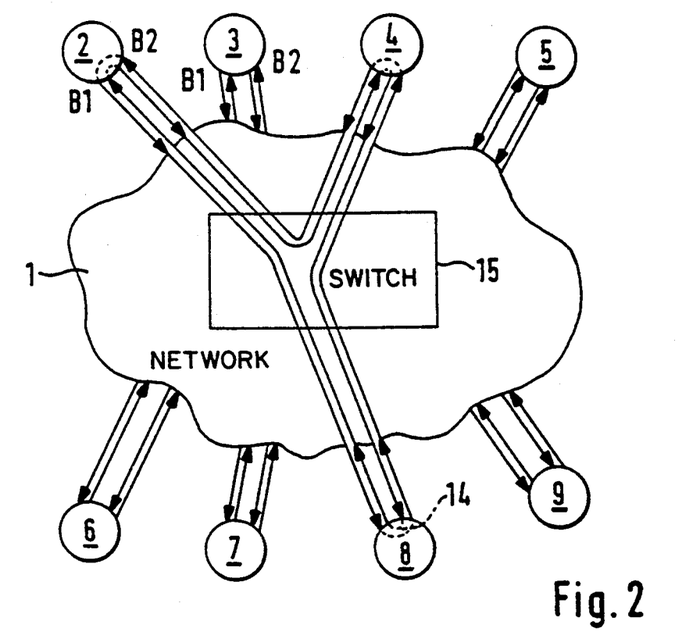
FIG. 2 shows the principles of the present invention used with a ring configuration and in connection with an ISDN network.

In FIG. 2 it is shown a plurality of nodes 2-9 connected to an ISDN network 1. All the nodes 2, 4, and 8, which shall now take part in a conference connection, are mutually interconnected via this network. And the set-up of the conference may be done from any of the nodes, via at least one switch 15 included in the network.

When ISDN are concerned, each subscriber dispose two B-channels B1 and B2 which usually receive and transmit two different kind of information in parallel. If e.g. one B-channel is used in an existing telephone connection, the normal use allow the other B-channel to be used simultaneously, but rather in a different application, e.g. to connect a telefax to the network.

Now these two B-channels may be used to set up a conference ring connection in the following manner:

Subscriber 2 has a desire to have a conference including subscribers 4 and 8. Then he makes a call to number 4 on his first B-channel through one or more switches 15 and inform 4 of his desire. The connection between 2 and 4 is kept alive on their channel B1 while 4 makes a call to 8 on the second B-channel. The same or other switches in the network may then be activated. On the figure only one switch is shown, but the invention is of course not limited by this example. In this manner the ring will be built up, step by step, until subscriber 8 calls up subscriber 2 on his B2 channel, and then the complete ring connection is established. It is then of course assumed that modified node sets are arranged at these nodes to obtain an interconnection through the node set between the two B-channels. This is explained in more detail below, in connection with the description of the node unit, and is also suggested with dotted small curves 14 in FIG. 2 within the three nodes participating in the shown conference.

The number of participating nodes are not restricted to a limited number. The only requirement is that all the participants have a conference type node equipment.

As shown in FIG. 2, the obtained conference ring through the ISDN network will then consist of one completed two-way ring connection, which also may be considered as two one-way completed ring connections.

Within the node terminals are then also Coding/decoding-and encrypting/decrypting-units are also arranged within the node terminals. This is however not shown in the FIG., but will be described in connection with FIG. 3.

The ring connection according to FIG. 2, may be used as a dual conference ring where each one-way ring represents what we above have called a resource of the system, and according to the present invention the following precautions are taken:

A digital approach is used.

Any conference node may access any ring connection for transmission, but only if the ring is free.

Only one single node can transmit information to a ring at a specific time.

All nodes listen to all the information on all of the rings during all the conference.

Each ring is preferably broken at the input end of each active node connected to this ring.

If the number of accessible rings are lower than the number of conferees, the breaking of the ring is undertaken on a dynamically base, e.g. as each node receives its own transmitted signal, the ring is broken at the input to own node.

If the number of rings correspond to the number of conferees, each ring may have a statically break at its ring return. I.e. the total system is then static.

A higher number of rings than of conferees are of no interest as it only represents redundancy of the system.

The principle with broken ring(s) used as transmission resources are not mentioned before. "The broken ring principle" represents the preferred embodiment as it gives only one transmitted signal on each resource, and summing, attenuation as well as echo cancelling are avoided. A better explanation of the broken ring principle and the dynamic broken ring principle shall be given in connection with FIG. 3.

From the above statement follows that only two conferees may be active at the same time in such a system. This limitation is not a serious one during normal conference usage, as there only will be at maximum two active participants in a normal conversation in one specific moment.

However the ring connection established via an ISDN network, comprises two digital one-way channels, and the following features should be noted:

Only two one-way connections exist.

Only two participants in the conference can be active simultaneously.

If a third participant tries to take part in the conference while two already are involved, his attempt to access the conference will not find any free channel, and therefore he has to wait for the release of a resource.

One active participant is connected to each channel.

If more than two participants try to take part in the conference simultaneously they are barred by the system as only two ring channels are available.

The circular connection comprise a physically closed loop, but the circle is dynamically broken by both the active participants. That is: A local generated signal which passes through a completed circle connection shall, when it arrives at its origin node, break the ring at that point.

Figure 3:
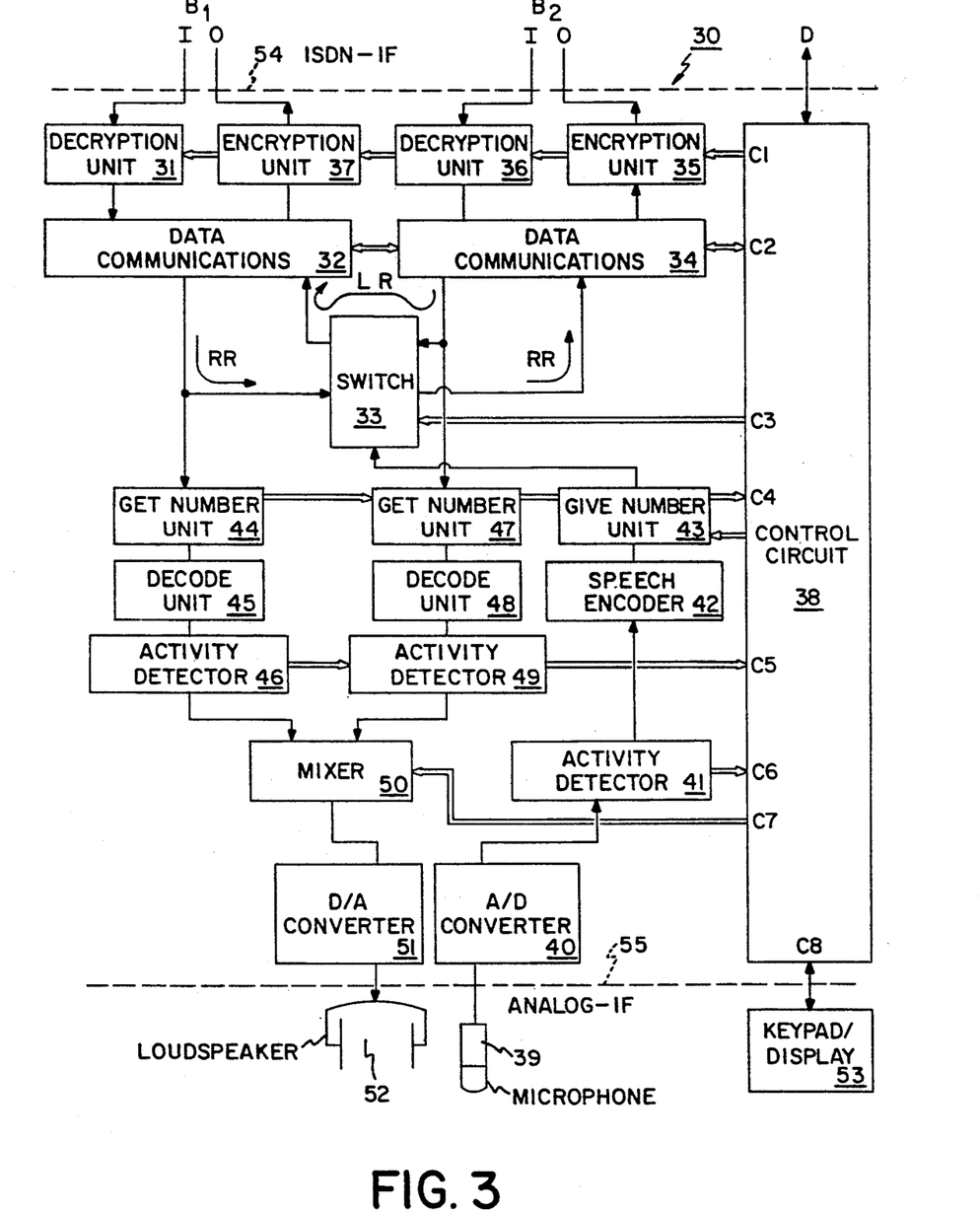
FIG. 3 shows a functional block diagram of one possible node design for the node used in accordance with FIG. 2.

In FIG. 3 the main structure of a node terminal is shown. All the nodes which participate in the conference are connected to an ISDN network via individual connections.

We shall now, by referring to FIG. 3, describe the functions which shall be prosecuted in each conference node.

The ISDN world is situated on the top of FIG. 3, above the dotted line 54, which represent the ISDN interface.

The conference node itself, is shown below the dotted line 54. If we first consider the passive or listening mode of the complete node 30, the main activity of the node in this case is to loop the two rings through the node and to listen to both of them. During looping the continuity of both rings are kept through the node.

One ring passes from left, through the B1 input terminal I, through the decryption unit 31, via the data communication unit 32, switch 33, data communication unit 34, to encryption unit 35, before it ends at output 0 at the B2-channel. This ring is called Right Ring and is illustrated by the two arrows RR.

The other ring passes from right, through the B2 input terminal I, through the decryption unit 36, via the data communication unit 34, switch 33, data communication unit 32, to encryption unit 37, before it ends at output 0 at the B1-channel. This ring is called Left Ring and is illustrated by the arrow LR.

If all participating nodes use the same key for encryption and decryption, the ring signal could be looped before the encryption devices. This would require a slightly different configuration than in FIG. 3.

At the same time both the inputs are monitored and listened to by following arrangement:

The Right Ring input signal is further applied from 32 to 44, 45, 46 down to the mixer 50. Similarly the Left Ring input signal applied from 34 to 47, 48, 49 down to the mixer 50, where the two signals are added linearly to produce the sum signal, and finally the digital sum signal is converted to an analog signal at D/A converter 51 before it is transferred to loudspeaker 52 where the conferee can listen to the speech. However, the mixer may alternatively close any or both of the speech channels under control of the Control Circuit 38, and thus present this to the conferee.

Let us now look at the active mode, i.e. when the node is transmitting local generated signals into one of the conference rings.

When the conferee using this particular node speaks into the microphone 39, the analog signal produced is converted in A/D converter 40, and the resulting signal is detected by Activity detector 41. 41 reports this activity to the Control Circuit 38. As a response to this detection of the local activity the Control Circuit 38 forwards a control signal to the switch 33 from its control output C3, which causes the switch to either:

I) (If ring RR is free) break the loop RR at its input to the switch, and to instead route the local signal, when it has passed the speech encoder 42, and the Give Number unit 43, further to the right branch of the Right Ring looping, leading to the output on the B2-channel, or to II) (If ring LR is free) break the loop LR at its input to the switch, and to instead route the local signal, when it has passed the speech encoder 42, and the Give Number unit 43, further to the left branch of the Left Ring loop, leading to the output on the B1-channel.

III) (none is free). Do nothing while waiting for a free ring (LR or RR).

The Control Circuit 38 controls the dynamic opening/closing of the completed rings in such a manner that the local generated speech signal in a digitalized form, goes out on a free conference ring connection to be passively listened to by all the remaining conferees.

The opening of the ring is not done before the node's own generated random number has returned via the ring. If another random number is received, it is compared with the own generated number and the attempt to access the ring is given up if the received number has higher priority than the own generated number. If the numbers should turn out to be identical the nodes involved should try again.

Which of the alternatives I, II and III to be selected is determined by the Control Circuit 38 together with the two Activity Detectors 46 and 49 which detects which of the ring connections that are free, and produces an output control signal on output C3 in accordance with these detected values.

To give a still better understanding of the circuits of the node, the function of all boxes included are listed below:

An ISDN interface (basic access interface) 54 provides a full standardized ISDN 2B+D interface, giving two full 64 kb/sec bidirectional, transparent, synchronous, digital channels; and one 16 kb/sec asynchronous data channel, using LABD protocol.

The two B-channels are labelled $B_1$ and $B_2$ and may be connected to two different ISDN subscribers. The D-channel may be connected and disconnected to any ISDN subscriber independent of the B-channel connections.

Encryption units (ENCRY) 37 and 35 provide full 64 kb/sec encryption where encryption algorithm is optional, and encryption keys are provided by the Control Circuit 38 in the initializing phase of the connection.

Decryption units (DECRY) 31 and 36 provide full 64 kb/sec decryption where decryption algorithm must correspond to the encryption algorithm used in Encryption units. The keys for decryption is provided by the Control Circuit in the initializing phase of the connection.

These units interpret and synchronize the decryption device according to the encryption synchronization information provided by the ENCRY-box.

Data channel units (DATACH) 32 and 34 are used to provide the Control Circuit with data communication facilities over the B-channel connections, either by a publicly known protocol such as X.25 or by a conference node application specific protocol. They are meant to be used in an initial phase for ring setup and authentication service, for inclusion and exclusion of participants in the conference and for secure take-down of the conference. The DATACH units will be totally transparent in normal conference mode.

A switch unit 33 provides a possibility to loop incoming speech on B1 out on B2, and to loop incoming speech on B2 out on B1 at the same time. Or it may connect outgoing speech from the ENCODE box to a specified outgoing B-channel, and at the same time keep the loop of the other outgoing B-channel. The connections are managed by the Control Circuit.

Getnumber units (GETNUM) 44 and 47 will look for any bit pattern different from the idle pattern of a channel which will be either the random number provided earlier by this node's GIVENUM unit 43 or a random number provided by any of the other nodes in the ring. (This will be defined in the operation specification). When such a bit pattern is found, the GETNUM box will alarm the Control Circuit and transfer the number to it. The GETNUM box will be in either idle or active state, managed by the Control Circuit. The Control Circuit's handling of the GETNUM boxes of the two channels are totally independent of each other. An Encode unit (ENCODE) 42 provides speech coding of the linear digital speech signal provided by the A/D box. The speech coding algorithm used must be applicable to 64 kb/sec. with synchronization included. There are no other restrictions and one could use either PCM A-law for low cost applications of CCITT G.722 coding for high-quality speech.

A Givenumber unit 43 provides a random number (generated by the control circuit 38) if the local conferee is going from passive to active state and is triggered by the control circuit.

Decode units (DECODE) 45 and 48 provide speech decoding according to the algorithm specified for encoding. If synchronization is necessary it must be done using information received in the encoded signal from an ENCODE box.

Activity detectors (ACTDET) 41 and 46, 49 perform activity detection on the two incoming and the one outgoing speech channels, and report the activity status to the Control Circuit. The Control Circuit may choose polling or interrupt for receiving these reports. The activity detection algorithm may be based on signal energy and zero crossings. The ACTDET boxes are managed separately by the Control Circuit and takes part in the dynamic broken ring decisions.

A Mixer 50 may add together the two decoded speech channels into one speech channel in the correct input format for the D/A box. And it may close any or both of the speech channels. It is managed by the Control Circuit.

A Microphone 39 gives active signals from the local conferee into the node.

A Loudspeaker 52 listens to the ring information, both in active and passive mode.

A Keypad/Display 53 is a human user interface to the control circuit 38 and the different conference services where characters (letters and numbers) may be entered on the keypad and where information may be presented on the display.

A Control circuit 38 generates and controls control signals which decide the sequences of all the node operations in dependence of each other.

A/D-D/A converters 40 and 51 convert digital signals to analog signals and vice versa.

In an Analog interface 55 the D-channel shown as an input to/output from the Control Circuit 38 towards the ISDN world, is the regular D-channel of the ISDN system. This channel shall in our case usually be used during set-up and signalling. It may also be used for key distribution.

It should be noted that the ring signals are looped through all passive nodes. This means that the passive nodes as well as the active nodes are listening to both rings. And the active nodes are transmitting their signals out to one of the rings while they still are listening to (at least) the other ring.

However it should be noted that a node only can access a free ring. If a ring is monitored and it is found that another conference node is transmitting a signal on the ring, an access is not obtained at the moment.

The accessing method has to be solved so that each and every node taking part in the conference may access only a completely free ring or resource.

To ensure that a node shall not access a resource, such as a ring, simultaneously as another node accesses the same resource or ring from another connection point, a preference system may be introduced, according to which the participating conference nodes are given a certain but variable priority ranking.

This may be done by means of a random number generator (not shown in the figures) in each node, which generates a random number and assigns it to the ring each time a node tries to access a free ring. The value of the assigned random number will then decide the priority ranking according to which the nodes shall be given access. As the numbers are completely random, the probability of obtaining access is the same for each and every node each time access is desired by more than one node to one ring at the same time.

The functions described may be implemented in hardware or in software. Both kinds of solutions or any straight forward combination of both solutions are within the scope of the present invention.

Usually a dual ring design shall act as desired as it very seldom is a need for more than two active participants in the conference at the same moment.

When a participating conferee leaves the conference, either on own initiative by simply breaking his own connection or because the remaining parties want to exclude him, the principle is that the adjacent two nodes shall detect that one participant has left, and then the ring has to be completed without this earlier participant. Thus the process otherwise is similar to that described for setting up the ring first time.

A similar approach may be used when it is decided that a new member is wanted in the conference. Then it must be decided where in the ring he shall enter, and then the neighboring nodes have to call him up on different B-channels (or only one of the neighboring nodes makes a call to him, but then the newcomer himself has to fulfill the ring as explained earlier for node No. 8.).

Both when an existing participant is excluded and when a new participant is included a new ring has to be fulfilled, and new keys also must be circulated to secure the crypto conference connection against eavesdropping from the node who left the conference.

Loud speaking telephone sets may represent a problem in such conference connections as the acoustic echo of the signals received in each room will act as a new sending signal from this set. Therefore it is preferred to use ordinary micro telephones in stead of loud speaking apparatus or use known technique to overcome the problem.

The principle is as mentioned in particular valuable when secure conference systems are considered. Usually the conference principle is in conflict with the desire of secure transmission, as digital signals during a conference usually has to be added together to make up a sum signal. And all the conferees shall then listen to the sum conference signal. However an encrypted signal is not linearly modulated, and therefore the encrypted signals cannot be added and afterwards be decrypted back to the clear signal.

In this invention this inherited problem is partly solved by having a distributed encrypting/decrypting system, and partly by incorporating both an encryption device and a decryption device at each node, at the input, respectively at the output.

In a method to establish a speech conference connection between a selected rather small plurality (2, 4, 8) of nodes, selected freely among a larger plurality of nodes (2-9) interconnected in a network (1), each and every node (e.g. 2) among the freely selected group (2, 4, 8) of conference participating nodes may send the same information to all the remaining participating nodes (4, 8) via the conference connection while the remaining nodes (3, 5, 6, 7, 9) cannot take part in this transmission and receiving of information.

In still another embodiment, any one of the nodes (2, 3, ... 9) may initiate via the common network facilities (1) and only on a per call basis, may be built up a freely selected group (2, 4, 8) of conferencing nodes, and any initiating first node (e.g. 2) within this selected group of nodes first may access one (e.g. 11) among a set (10) comprising at least one transmission resource(es) (11, 12, ... n) accessible to all the nodes (2, 4, 8) in the selected group, and then transmit locally generated information to this transmission resource (11) which is arranged so that all the remaining participating nodes (4, 8) may monitor this information, and any of the remaining participating nodes (4, 8) also may access anyone (e.g. 12) of the transmission resource(s) (10, 11, 12), assuming that this resource is not already occupied by another transmitting node, and via this latter transmission resource (12), may take part in the conference.

In still another embodiment, the common connection has at least one star or ring configuration, or even may be a combination of such configurations.

In still another embodiment, all the required signal processing as transmitting, receiving, accessing, addressing, coding, and decoding; are undertaken distributed in each of the nodes (30, FIG. 3) having such a conferencing facility, while the routing and switching and possible multiplexing processes undertaken centrally in the telecommunication network.

In still another embodiment, the conference connection is secured against unauthorized use by an encryption/decryption process using changeable crypto keys, and that these keys are distributed to the participating nodes via the conference connection during its setting up process.

In still another embodiment, the transmission recourse has at least one, one-way ring configuration, a conference connection is set up from any one (e.g. 2) of the participating nodes (2, 4, 8) by calling the next participating node (4) in the ring and thereby establishing a connection to this next node via the telecommunication network, and so on in a propagating process, until the last participating node (8) in the conferencing group makes a call and a connection to the initiating node (1), whereby the ring is closed.

In still another embodiment, the transmission resource has at least one, one-way ring configuration and the network is an Integrated Services Data Network (ISDN), and the conference ring is set up from a first initiating node to the next conference participating node on the first nodes first B-channel, and so on until the last participating node establishes a connection to the initiating node on their second B-channels.

In still another embodiment, the information resources are a plurality of information busses (10, 11, 12, ... n).

In still another embodiment, a digital conference information system includes a number of participating nodes (2-9), each being mutually interconnected via a switching network (1) such as a switched telecommunication network, and carries out a method to transmit and receive information via the telecommunication network (1). The telecommunication network (1) comprises mutually interconnected nodes (2-9) in a network built up so that each and every node (2) among a freely selected group (2, 4, 8) of participating nodes may send information to all the remaining participating nodes (4, 8) via an established, common connection, and the transmission resource set comprises at least one ring configuration, wherein each node (2, 4, 8) with conferencing facilities, further incorporates decoupling devices (30, 41, 46, 49) which recognizes and detects the locally generated signal when it returns to its transmitting node, and as a response to this recognition breaks the ring at the input to this node and thus generates a dynamically broken ring configuration.

In still another embodiment of the conference system, the number of dynamically broken ring connections present in the system are lower than or equals the number of nodes which participates in the established group, and each node comprises an accessing means which within a certain time interval may access any one of the transmission resources, assuming that the resource in question, is free in this time interval.

In still another embodiment, the conference system further comprises a preference system which operates so that when more than one participating nodes are trying to obtain access to the same channel at the same time interval, only the participant with the highest preference will succeed.

In still another embodiment of the conferencing system, each node has a random number generator so that each attempt by any node to access a free transmission resource is assigned a random number generated locally in that node and is available for any other node listening to this free transmission resource, a highest priority and thereby the free transmission resource preferably being given to participant according to the assigned random number.

This description is only representing some preferred embodiments of the present invention. However this is not meant to limit the invention, which has a much wider scope as defined in the claims below.

What is claimed is:

1. Method to establish a speech conference connection between a group of conference participating nodes (2, 4, 8) which can freely be selected among a greater plurality of nodes (2-9) having conference facilities, and which can be interconnected by at least one telecommunication network (1) having at least one switching exchange (10) for establishing at least one conference ring, the method including the steps of:

providing conference participating nodes with completely identical designs so that each node (2, 4, 8), can perform all signal processing including amplification and speech-coding/decoding in a decentralized manner, while routing and switching of information takes place in the at least one network exchange (10);

connecting all the conference participating nodes (2, 4, 8) in series in a conference ring, which only includes these conference participating nodes (2, 4, 8) for each new conference ring to be established;

sending a digitally represented sound information from an active sending node as one of the conference participating nodes (2, 4, 8) to other conference participating nodes;

subjecting the digitally represented sound information to no other signal processing than ordinary copying in each node;

circulating the digitally represented sound information in the conference ring before it returns back to the active sending node; and deleting the digitally represented sound information in the active sending node so the conference ring is terminated.

2. Method according to claim 1, wherein the method includes the steps of establishing each new connection in the telecommunication network (1) in a freely selected group (2, 4, 8) of conferencing nodes initiated from any one of the nodes (2, 3, ... 9), accessing by any chosen node (2) one of said at least one switching exchanges (10) which are accessible to all the participating nodes (2, 4, 8), sending by a first active node a locally generated information to the conference ring which is arranged such that all the other participating nodes (4, 8) may listen to this information, accessing any of the other nodes (4, 8) to any free transmission resource in said at least one switching exchange (10), so that it can take part in the conference, and releasing the active node from the conferencing ring again for use by a different node when it is no longer active.

3. Method according to claim 1, wherein the method further includes the step of distributing on a D-channel changeable cryptographic keys to participating nodes in the conference ring during the setting up of the conference; and using the keys in an encryption/decryption process by each participating node to secured against unauthorized eavesdropping in the conference ring.

4. Method according to claim 1, wherein a conference connection is set up from any one (e.g.2) of the participating nodes (2, 4, 8) by calling the next participating node (4) in the ring and thereby establishing a connection to this next node via the telecommunication network, and so on in a propagating process, until the last participating node (8) in the conferencing group makes a call and a connection the initiating node (1), whereby the ring is closed.

5. Method according to claim 1, wherein the network is an Integrated Services Digital Network (ISDN), the conference ring is set up from a first initiating node to the next conference participating node on a first node's first B-channel, and so on until the last participating node establishes a connection to the initiating node on their second B-channel.

6. Digital conference information system for performing the method according to claim 1, the system comprising a number of participating nodes (2-9), each of which may be mutually interconnected via a switching network (1) such as a switched telecommunication network to carry out the method to transmit and receive information, comprising mutually interconnected nodes (2-9) arranged so that each and every node (2)

among a freely selected group (2,4,8) of participating nodes may send information to all the remaining participating nodes (4–8), and further comprising a transmission resource (10) having at least one ring configuration, each node (2,4,8) with conferencing facilities, further incorporates decoupling devices (30, 41, 46, 49) which recognizes and detects the locally generated signal when it returns to its transmitting node, and as a response to this recognition breaks the ring at the input to this node and thus generates a dynamically broken ring configuration.

7. Conference system, according to claim 6, wherein the number of dynamically broken ring connections present in the system are lower than or equals the number of nodes which participates in the established group, and each node comprises an accessing means which within a certain time interval may access any one of the transmission resources, assuming that the resource in question, is free in this time interval.

8. Conference system according to claim 7, wherein the system further comprises a preference system which operates so that when more than one participating nodes are trying to obtain access to the same channel at the same time interval, only the participant with the highest preference will succeed.

9. Method according to claim 2, wherein the conference connection is secured against unauthorized use by means of an encryption/decryption process using changeable crypto keys, and that these keys are distributed to the participating nodes via the conference connection during the setting up 10. A telecommunication system
a plurality of conferencing nodes (2–9) including one or more speaking nodes for providing a speaking signal and listening nodes, each listening node responsive to a switched speaking signal; and
conference call connection means (10), responsive to the speaking signal, for providing the switched speaking signal to all the listening nodes except the speaking node;
wherein each of the plurality of nodes has a pair of first and second channels (B1 B2);
wherein the conference call connection means (10) has at least two resource buses (11, 12) and a matrix (M) for providing the speaking signal to the listening nodes but not the speaking node;
wherein each node has its first and second channels (B1, B2) connected to the connection means (10) so the speaking node can transmit a first speaking signal on the first channel (B1) and can receive a second speaking signal on the second channel (B2) from another speaking node.

11. A telecommunications system, which is an Integrated Service Digital Network (ISDN) comprising:
a plurality of conferencing nodes (2–9) being arranged in two one-way conference rings with a pair of first and second channels (B1 B2), each of the plurality of nodes having a pair of adjacent nodes in the ring; the nodes including a speaking node for providing a speaking signal on a channel, and further including listening nodes, each listening node responsive to a switched speaking signal; and
conference call connection means (15), responsive to the speaking signal, for providing the switched speaking signal to all listening nodes, the conference connection means (15) receiving the switched speaking signal back from each listening node and providing it to a next adjacent listening node in the ring; the conference connection means (15) providing the speaking signal to the speaking node that generated it after providing it to all the listening nodes, the speaking node deleting the speaking signal from the conference ring and releasing the channel for use by other speaking nodes.

12. A telecommunication system according to claim 11, wherein each node includes decryption means (31,36) for decrypting an incoming speaking signal and decryption means (36,37) for encrypting an outgoing speaking signal.

13. A telecommunication system according to claim 12, wherein each node includes data communication means (32,34) adapted for including and excluding the node in the conferencing ring.

14. A telecommunication system, which is an Integrated Service Digital Network (ISDN) comprising:
a plurality of conferencing nodes (2–9) being arranged in two one-way conference rings with a pair of first and second channels (B1 B2), each of the plurality of nodes having a pair of adjacent nodes in the two respective conference rings; the nodes including a speaking node for providing a speaking signal on a channel, and further including listening nodes, each listening node responsive to a switched speaking signal; and
conference call connection means (15), responsive to the speaking signal, for providing the switched speaking signal to all listening nodes, the conference connection means (15) receiving the switched speaking signal back from each listening node and providing it to a next adjacent listening node in the ring; the conference connection means (15) providing the speaking signal to the speaking node that generated it after providing it to all the listening nodes, the speaking node deleting the speaking signal from the conference ring and releasing the channel for use by other speaking nodes;
wherein each node includes decryption means (31,36) for decrypting an incoming speaking signal and decryption means (36,37) for encrypting an outgoing speaking signal;
wherein each node includes data communications means (32,34) adapted for including and excluding the node in the conferencing ring;
wherein each node includes switching means (33) either for looping incoming speaking signals on one channel (B1) as outgoing speaking signals on another channel (B2), or for looping incoming speaking signals on one channel (B2) as outgoing speaking signals on another channel (B1).

15. A telecommunication system according to claim 14, wherein each node includes get number unit means (44,47) for detecting at an idle pattern number of the channel of the incoming speaking signal, and give number means (43) for providing the outgoing speaking signal with a randomly generated number; and further wherein each node includes decode means (45,48) for providing speech decoding to the incoming speaking signal, and encoding means for providing speech encoding for the outgoing speaking signal.

16. A telecommunication system according to claim 15, wherein each node includes activity detectors (41,46,49) for detecting activity by the incoming speaking signals or the outgoing speaking signal, for providing an activity report control signal C6 to a control circuit (38).

17. A telecommunication system according to claim 16, wherein each node includes a mixer (50) for adding the two incoming speaking signals, further including digital/analog means (51) for converting an added digital incoming speaking signal into an added analog incoming speaking signal, further including analog/digital means (40) for converting the outgoing speaking signal into a digital outgoing speaking signal, further includes a loudspeaker (52) for generating the added analog incoming speaking signal for listening, and further includes a microphone (39) for receiving the outgoing speaking signal from a speaker. conferee.

18. A telecommunication system according to claim 17, wherein each node further includes microprocessor control means (38) for receiving control signals (C2, C4, C5, C6) respectively from the decryption means (31,36), encryption means (35,37), data communication means (32,34), get number unit (44,47), activity detector means (41,46,49), and for providing control signals (C2',C3,C4',C7) respectively to data communication means (32,34), switching means (33), give number means (43) and mixer means (50).

19. Method to establish a speech conference connection between a group of conference participating nodes (2,4,8) which can freely be selected among a greater plurality of nodes (2-9) having conference facilities, and which can be interconnected by at least one telecommunication network (1) having at least one switching exchange (10) for establishing at least one conference ring, wherein each node may be mutually interconnected via the switching network (1) such as a switched telecommunication network to transmit and receive information, the nodes (2-9) arranged so that each and every node (2) among a freely selected group (2,4,8) of participating nodes may send information to all the remaining participating nodes (4-8), and the switching exchange (10) having at least one ring configuration, each node (2,4,8) with conferencing facilities, further incorporates decoupling devices (30, 41, 46, 49) which recognizes and detects the locally generated signal when it returns to its transmitting node, and as a response to this recognition breaks the ring at the input to this node and thus generates a dynamically broken ring configuration;

wherein the number of dynamically broken ring connections present in the system are lower than or equals the number of nodes which participates in the established group, and each node comprises an accessing means which within a certain time interval may access any one of the transmission resources, assuming that the resource in question, is free in this time interval;

wherein the system further comprises a preference system which operates so that when more than one participating nodes are trying to obtain access to the same channel at the same time interval, only the participant with the highest preference will succeed; and wherein each node comprises a random number generator so that each attempt by an node to access a free transmission resource is assigned a random number generated locally in that node and is available for any other node listening to this free transmission resource, a highest priority and thereby the free transmission resource preferably being given to a participant according to the assigned random number;

the method including the steps of:

providing conference participating nodes with completely identical designs so that each node (2,4,8), can perform all signal processing including amplification and speech-coding/decoding in a decentralized manner, while routing and switching of information takes place in the at least one network exchange (10);

connecting all the conference participating nodes (2,4,8) in series in a conference ring, which only includes these conference participating nodes (2,4,8) for each new conference ring to be established;

sending a digitally represented sound information from an active sending node as one of the conference participating nodes (2,4,8) to other conference participating nodes;

subjecting the digitally represented sound information to no other signal processing than ordinary copying in each node;

circulated the digitally represented sound information in the conference ring before it returns back to the active sending node; and deleting the digitally represented sound information in the active sending node so the conference ring is terminated.

* * * * *

UNITED STATES PATENT AND TRADEMARK OFFICE
CERTIFICATE OF CORRECTION

PATENT NO. : 5,210,794
DATED : May 11, 1993
INVENTOR(S) : Bente H. Brunsgard It is certified that error appears in the above-identified patent and that said Letters Patent is hereby corrected as shown below:

At column 13, line 31, after "setting up", --process-- should be inserted.

At column 15, line 12, after "speaker.", delete "conferee.".

Signed and Sealed this

Ninth Day of August, 1994

BRUCE LEHMAN

Attest:

*Attesting Officer*  *Commissioner of Patents and Trademarks*